Oct. 12, 1965   J. E. CHILDS   3,211,000
AUTOMATIC SCANNING SYSTEM
Filed March 26, 1962   4 Sheets-Sheet 1
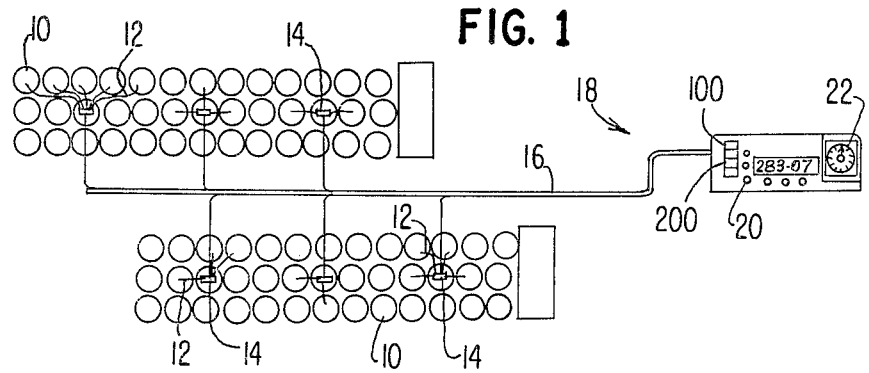
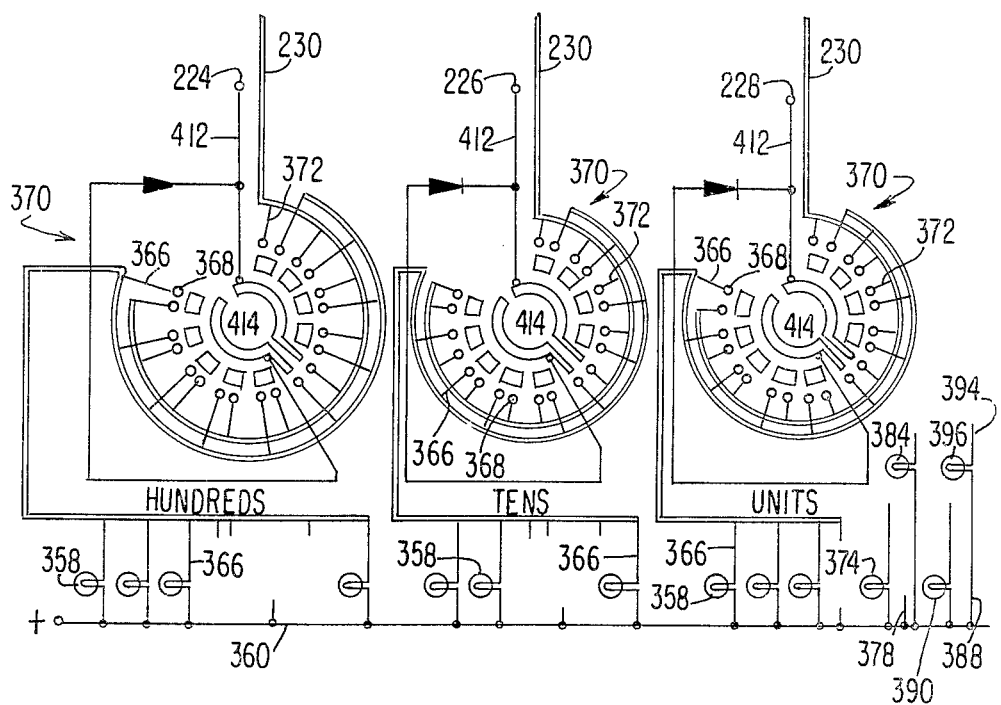
INVENTOR.
John E. Childs
BY
Ooms, McDougall & Hersh
Attys.

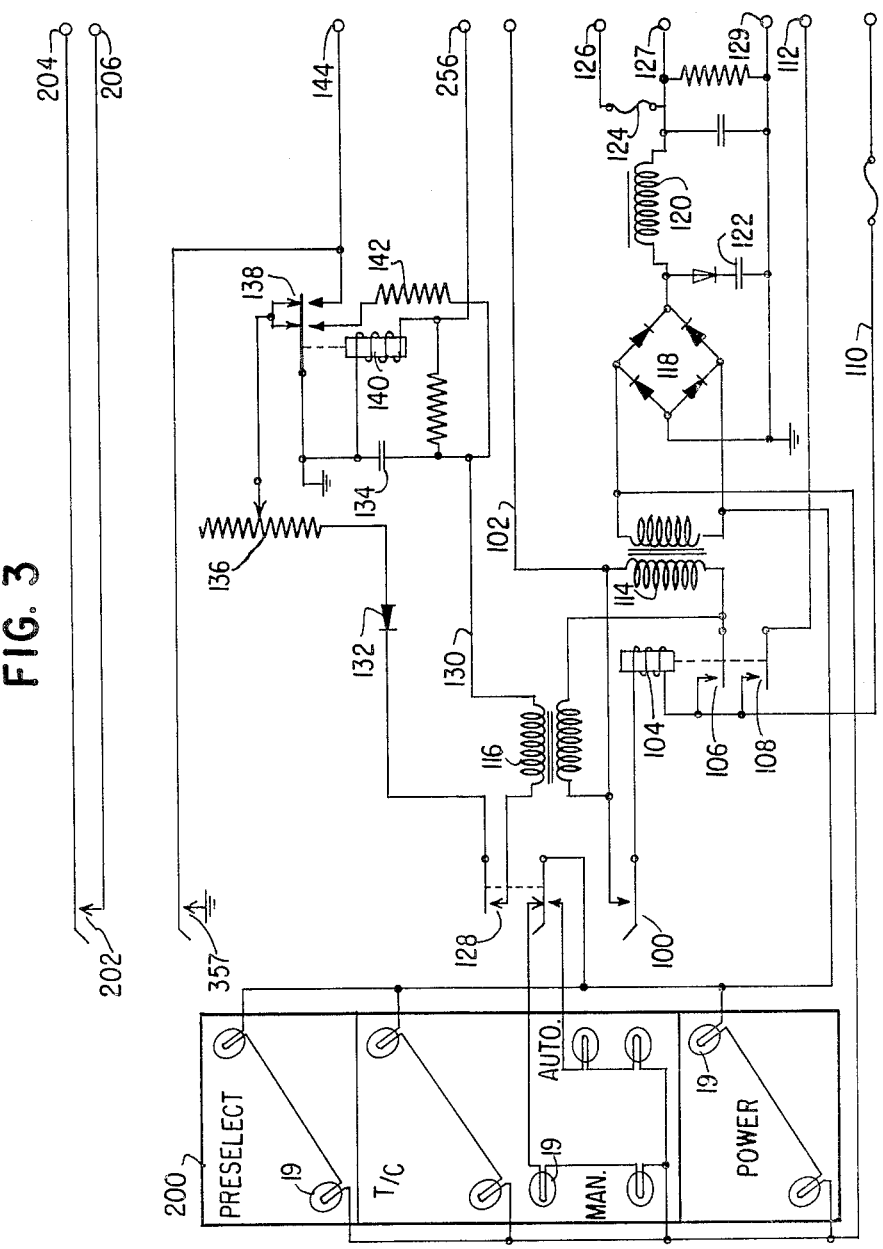

Oct. 12, 1965  J. E. CHILDS  3,211,000
AUTOMATIC SCANNING SYSTEM
Filed March 26, 1962  4 Sheets-Sheet 3

INVENTOR.
John E. Childs
BY
Ooms, McDougall & Hersh
Attys.

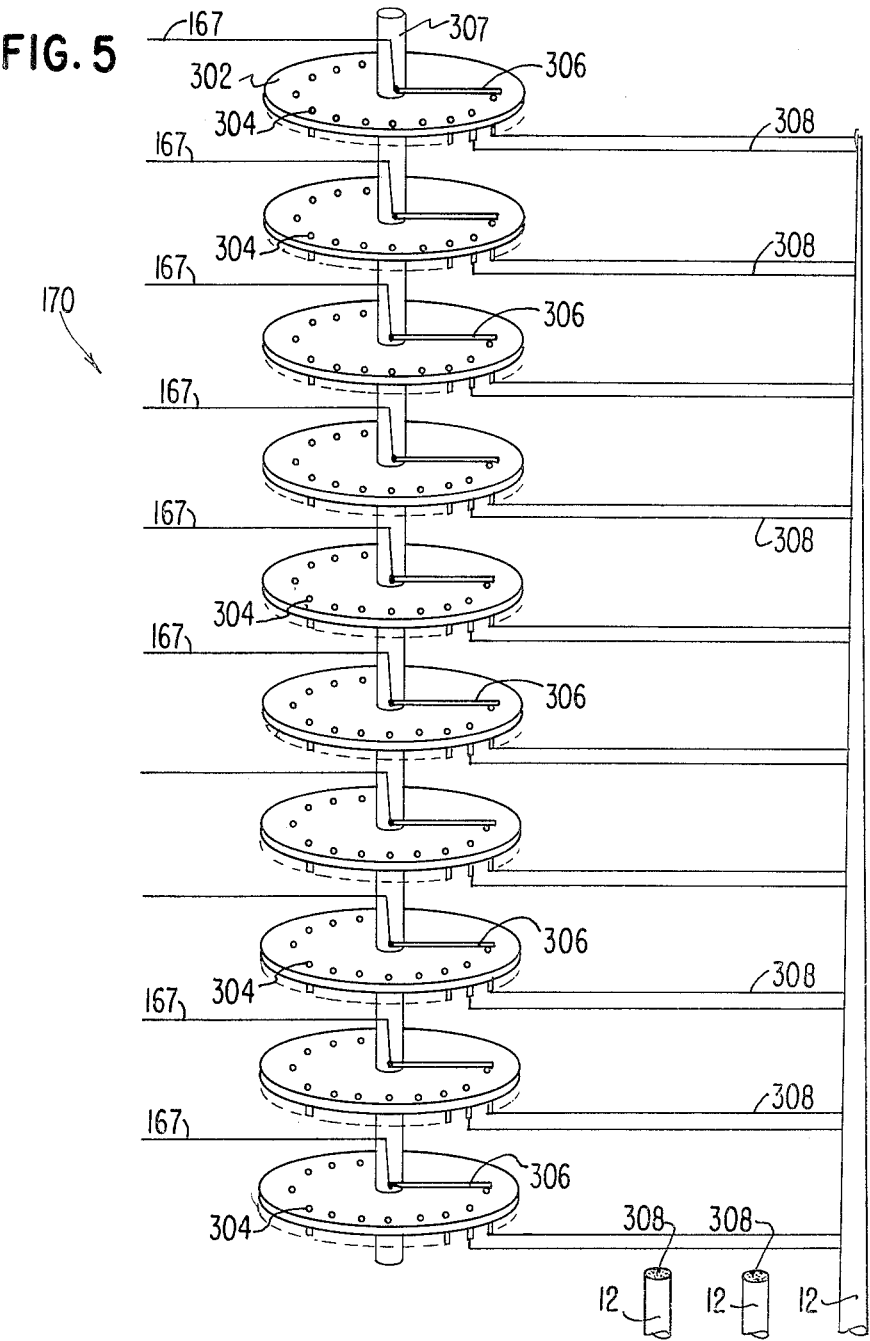

United States Patent Office 3,211,000
Patented Oct. 12, 1965

3,211,000
AUTOMATIC SCANNING SYSTEM
John E. Childs, Boone, Iowa, assignor to Rolfes Electronics Corporation, Boone, Iowa, a corporation of Iowa
Filed Mar. 26, 1962, Ser. No. 182,310
15 Claims. (Cl. 73—342)

This invention relates to an automatic scanning system which is particularly adapted for the reading of temperatures at a plurality of locations. The system of this invention in addition provides for visual display of the temperature readings for observation and recording.

A specific use of the system of this invention relates to the provision of a plurality of thermocouples at various locations in several grain storage bins or the like. The system provides a unique means for detecting the temperature response of the several thermocouples in a highly efficient and effective manner.

It is well known that a great deal of grain and other materials are stored in bins for long periods of time. These materials are subject to being damaged by moisture, insects, temperature changes and other circumstances. It is, therefore, desirable to provide means which will serve to detect detrimental conditions and which will, therefore, enable steps to be taken to preserve the materials. It is obvious that temperature changes can be detected by placing thermocouples within the storage means and it is also known that the detrimental conditions above noted give rise to temperature variations. Accordingly, conditions which would lead to damage in the stored grain or other materials can be detected by the use of thermocouple systems.

It has become increasingly difficult to provide efficient means for detecting temperatures within storage bins, this situation being largely due to the vast increase in the number of bins now in use. There is obviously great expense and inefficiency in a system which provides individual temperature reading devices for individual bins. However, there has not heretofore been available an effective system adapted to handle large numbers of storage bins each having thermocouples positioned at various levels within the bins. Where automatic scanning units have been developed, the capabilities thereof have been limited in many important respects. Known units have not provided for reading of temperatures at various intermediate stages, the units in most cases requiring reading of the system from a specified beginning point before reaching the desired intermediate point. Furthermore, known systems have not been capable of commencing readings at some intermediate bin followed by automatic reading through the remaining thermocouples in the installation.

It is one object of this invention to provide an automatic scanning system which is characterized by rapid and efficient operation and which provides a highly effective means for detecting temperature conditions at several levels within a large number of storage bins.

It is a more particular object of this invention to provide an automatic scanning system which can be operated from a single control station, which is provided with visual indications for each individual thermocouple in the system, which is provided with means for automatically scanning the entire system whereby each thermocouple can be read in sequence, and which also includes means for individually selecting groups of thermocouples anywhere in the system whereby information at specific locations can be immediately obtained.

These and other objects of this invention will appear hereinafter and, for purposes of illustration, but not of limitation, specific embodiments of this invention are shown in the accompanying drawings in which—

FIG. 1 is a diagrammatic illustration of a control station and bin arrangement characterized by the features of this invention;

FIG. 2 is a diagrammatic illustration of the selector control arrangement used in combination with other features of this invention;

Figure 4:
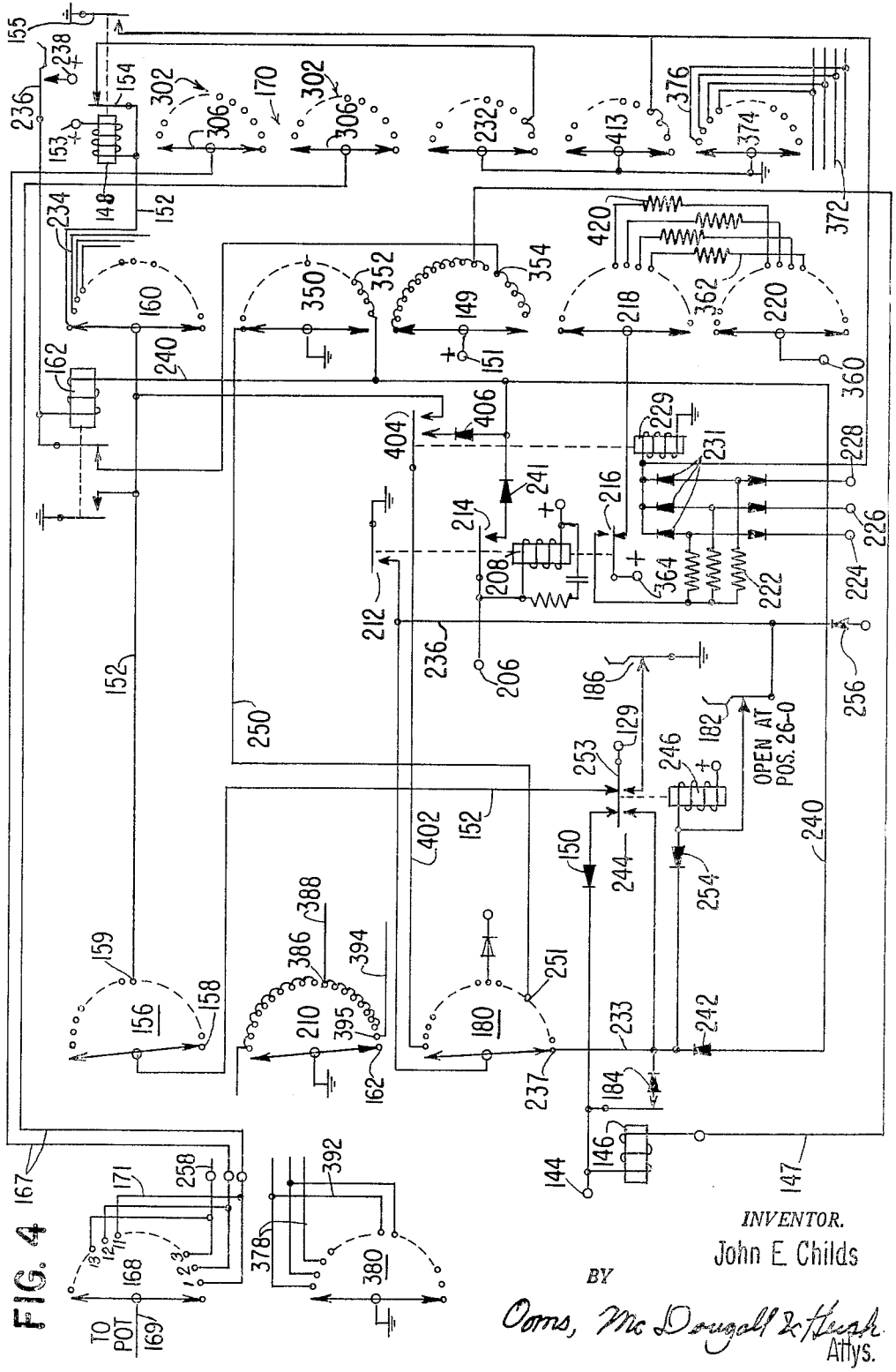

FIGURES 3 and 4 comprise a circuit diagram illustrating the operation of the scanning system of this invention; and FIG. 5 is a diagrammatic illustration of a remote switch unit employed in combination with the other features of this invention.

The present invention provides a temperature scanning system which operates automatically to read the temperature in several bins, for example, the bins 10 shown in FIG. 1. Cables 12 (for convenience shown leading only to a few bins) comprise a plurality of thermocouples and are adapted to be placed in each bin whereby each of the thermocouples in a given cable can be disposed at different levels in the bins for detecting the temperature at these levels. One or more cables can be provided for each bin if desired.

A plurality of remote switch units 14 are located among the bins 10, and several of the cables 12 are connected to each of the switch units. Conductor 16 comprises a common cable for each of the units 14 and connects these units to the control station 18. In the control station, which may be in any convenient location however remote from the bins, there is provided a console 20 provided with controls for the system. The console also includes a temperature indicating dial 22.

The circuit illustrated in FIGURES 3 and 4 includes a main power switch 100 which completes a circuit between A.C. hot conductor 110 and A.C. neutral conductor 102. Making of the switch 100 operates relay 104 which closes switches 106 and 108. Closing of these switches provides power to terminal 112 and also to transformers 114 and 116.

Current from the transformer 114 is rectified by a silicon bridge 118 and an inductor capacitor filter 120. This silicon bridge is transient protected by a diode-capacitor 122. With this arrangement, D.C. plus terminals 126 and 127 and D.C. minus terminal 129 are applied in the system. The secondary of the transformer 114 also serves to provide power for the lights 19 located on the panel 20. As suggested by the legends in FIG. 3, the lights 19 are adapted to operate when various portions of the system are in operation.

As previously noted, the system of this invention is capable of operating automatically whereby the thermocouples in the bins are each individually read and the temperatures indicated thereby are displayed by the dial 22. The automatic operation is commenced by making switch 128 after main power switch 100 supplies power at transformer 116. The transformer 116 supplies A.C. for the timer circuit.

This circuit includes a diode 132 and a capacitor 134 which is charged through variable resistor 136 and a set of relay contacts 138. When the capacitor 134 is charged above a certain level, the relay 140 operates and starts to discharge the capacitor through resistor 142. The capacitor discharges sufficiently to let the relay 140 drop out again making contacts 138 whereby the charging cycle repeats. The charging time can be varied by adjusting the variable resistor 136.

When the relay 140 operates, a ground is applied across terminal 144 due to making of switch 138 in the normally open position. The application of this ground serves to energize thermocouple switch coil 146 and remote switch coil 148 (FIG. 4). The coil 146 is energized by reason of the connection of conductor 147 to stepper 149 which provides a hot terminal 151. The coil 148 is associated with hot terminal 153 and a current path, therefore, extends along conductor 152, through steppesr 160 and 156, switch 253, diode 150 and to the terminal 144.

Energization of the coil 148 opens the switch 154 and closes switch 155 for purposes to be hereinafter explained. This coil also operates to move stepper 170 which comprises one of the remote switch units 14. In connection with this stepper coil and the other steppers to be referred to, it will be understood that a conventional type is contemplated. The contemplated units include a coil which when energized will cock the stepper, and the stepper is then adapted to move when the current pulse to the coil is dissipated and the coil is deenergized.

The stepper 170 comprises a plurality of levels with each level having a plurality of contact positions. The individual thermocouples in a cable 12 are connected at different contact positions in the respective stepper levels. FIG. 5 illustrates schematically a stepper of the type contemplated. This stepper includes a plurality of levels 302, each level having a plurality of contact positions 304 which are adapted to be engaged by wipers 306. The wipers move in response to rotation of the shaft 307 which, in turn, rotates in response to operation of stepper coil 148.

The thermocouple cables 12 leading to the stepper each include a plurality of thermocouples 308. In a typical arrangement, the cables 12 include twenty individual thermocouples 308, and the first 10 of these are secured at the No. 1 position of each succeeding level of the stepper. Thermocouples 11 through 20 of the first cable 12 are sequentially located at the second position in these same levels. Accordingly, the 1st and 11th thermocouple 308 will be secured to contact positions 1 and 2 of the uppermost level, while the 2nd and 12th are connected at the second level, etc.

The first 10 thermocouples of the next cable 12 are fastened at the 3rd position in succeeding levels, while the thermocouples 11 through 20 are fastened to the 4th position. This same order proceeds until all thermocouples for each cable 12 associated with a remote switch unit 14 are connected to the same stepper 170. The thermocouples are preferably connected in the described fashion for ease in recording temperatures, since the sequence of recording can thus be directly correlated with the relative positions of the thermocouples in the various bins. The thermocouples are positioned in the bins in the same sequence that they are fastened to the stepper. Similarly, the cables 12 are sequentially secured in accordance with bin locations, bin numbers or in some other logical fashion.

The wipers 306 are each connected through conductors 167 to one contact of a thermocouple stepper 168 which is connected by means of a conductor 169 to the potentiometer (not shown) for the system. The top wiper 306 is connected to the first contact of the stepper 168, the next wiper 306 to the second contact, and so on.

The coil 146 is provided for operating the thermocouple stepper 168 and, accordingly, this stepper moves across one contact each time a pulse is delivered through operation of relay 140. With this arrangement, the thermocouples connected to the stepper 170 will be sequentially read. Thus, the thermocouple connected at position 1 of the top level of the stepper 170 will be read when the wiper of stepper 168 is at the first contact position. In this case, since the conductor 167 leading to the first contact is connected to the wiper arm 306 of the first level. The thermocouple connected at position 1 of the next level in the stepper 170 will be read when the wiper of stepper 168 moves to the second contact position and so on.

As illustrated, the stepper 168 is provided with twenty contacts for its wiper to traverse. The contacts 11 through 20 are used to read the second positions of the levels of the stepper 170. Accordingly, it is necessary to provide for movement of the wipers 306 to these second positions after the temperature of the tenth thermocouple is read and before the stepper 168 moves to the eleventh contact.

The movement of the stepper 170 is accomplished through action of the stepper 156. This stepper, which is also controlled by thermocouple switch coil 146, moves to the contact point 159 when the tenth pulse dissipates. The contact point 159 is tied by means of the conductor 152 to the coil 148 and, accordingly, the eleventh pulse is delivered to this coil. Since the coil 148 controls the stepper 170, the wipers 306 will move to the second position at the time. Succeeding pulses will not energize coil 148 since the wiper of stepper 156 will move beyond the point 159. However, these succeeding pulses will provide for recording of temperature readings from the thermocouples connected to the second positions on levels 302. Tie wires 171 are provided to connect the conductors 167 to the contacts 11 through 20 of the stepper 168.

The operation of the system continues in a similar fashion until all thermocouples connected to the stepper 170 are read. Thus, the thermocouples in all the bins associated with a given remote switch unit 14 are sequentially read through continued operation of the pulsing unit, thermocouple stepper and through operation of the coil 148 and stepper 170.

In a proposed system employing the principles of this invention, twenty thermocouples are included in each cable 12. However, twenty-six contact positions are located on the steppers operated by coil 146, namely, steppers 156, 180 and 210. It is, therefore, necessary to home the wipers for these steppers after twenty thermocouple readings are taken in order to place the steppers in position for the reading of thermocouples associated with a succeeding position in the stepper 170.

To accomplish homing of the steppers a ground for relay 246 is provided through stepper 350, through stepper 180, and through cam switch 182. The stepper 180 is connected by means of conductor 250 to stepper 350. The point of connection 251 on the stepper 180 is located so that the wiper of this stepper reaches this point when the last of the twenty thermocouple readings is taken.

When the relay 146 moves the stepper 180 to this reset point 251, the relay 246 is energized thereby pulling in switch 253 to break the connection between the conductor 152 and the pulsing terminal 144. The ground for this coil 246 is then supplied through cam switch 186 and diode 254. The interrupter contacts 184, located between the coil 146 and ground, rapidly open and close thereby pulsing coil 146 and moving the steppers 156, 180, 380, 168 and 210 to home position.

When in the home position, a cam associated with one of the thermocouple steppers is adapted to open switches 182 and 186 thereby breaking one ground connection to the relay 246. The switch 253 then moves to the position illustrated and subsequent pulses delivered through terminal 144 will pass to conductor 152. Thus, the circuit to coil 148 is completed, permitting movement of stepper 170 in the manner above noted.

When the relay 246 and interrupter contacts 184 operate to pulse coil 146, it is necessary to remove the timer relay 140 from the circuit. This is achieved by applying ground to the relay through diode 256. This isolates the timer relay from the remainder of the circuit. When the steppers 156, 180 and 210 reach the home position, the ground is removed, and pulses delivered by the timer circuit will again pass through terminal 144.

After completion of the reading of all thermocouples associated with one remote switch unit 14, it is necessary to transfer to the next unit switch whereby the thermocouples in the cable 12 associated with this unit can be read. Each of the units 14 includes a stepper coil identical to the coil 148 of the first described unit. Similarly, a stepper of the same type as the stepper 170 will be associated with each remote stepper coil. The remote stepper coils are each connected to a contact of the stepper 160 in the same manner as the coil 148, and the leads 234 are provided for this purpose. The number of leads 234 corresponds to the number of remote units 14, and each is connected to a separate coil of the type shown at 148, and each coil operates a stepper similar to the stepper 170. Conductors 258 shown adjacent the thermocouple stepper 168 are adapted to be connected to other remote steppers in the same manner as the leads 167. Obviously, the number of such additional leads will depend on the number of levels existing in the several remote steppers.

In order to provide for reading of thermocouples associated with different remote units 14, the wiper of stepper 160 must move. The coil 162 is provided to operate the stepper 160, and this coil is adapted to be energized after the last thermocouple in the last cable 12 of a unit 14 has been read. The energizing of this coil is as follows: When the stepper 160 is stepped after all the readings for a unit 14 are completed, a cam switch 236 is adapted to be mechanically closed by the stepper. This switch applies battery from source 238 across the coil 162. Ground is provided for the coil 162 through conductor 240, diode 242 and switch 244. The switch 244, as explained, is held in the closed position by the relay 246 during homing of the thermocouple steppers. When the thermocouple steppers reach home position, cam switch 186 is opened, breaking ground to coil 162. Accordingly, stepper 160 moves one position as the coil 162 is de-energized.

The switch coil 162 operates to provide for sequential reading of all the thermocouples connected to the remote switch units. After the last thermocouple on the last remote unit is read, the stepper levels 350 and 149 serve to home the stepper 160. These levels are also operated by the coil 162 and the wipers thereof are adapted to reach the positions 352 and 354, respectively, when the wiper of stepper 160 moves off the last position which is connected to a lead 234. The stepper level 149 provides battery for coil 162 through interrupter contacts 356. The stepper level 350 provides ground for the coil 162 when the wiper thereof reaches position 352. The interrupter contacts 356 open and close, thus providing for operation of the coil 162 and homing of the associated steppers. It will be noted that battery for the thermocouple coil 146 is removed during this homing operation to prevent operation of the coil 146.

The entire automatic operation which has been described depends upon energization of the timer circuit by means of transformer 116 (FIG. 3). Reading of the thermocouples in the described sequential manner can also be accomplished manually if switch 128 is left open and if manual operating switch 357 is alternately opened and closed. As illustrated, this manual switch when closed applies ground to terminal 144 and, therefore, alternate opening and closing of this switch will provide for delivery of pulses to coil 146. The sequential reading of the thermocouples will proceed as long as the manual switch is operated.

The scanning system of this invention also includes visual indications in the form of lights on the face of the console 20 so that each thermocouple can be identified as the temperature reading is taken. These lights, shown diagrammatically at 358, 384 and 396 in FIG. 2, can be of any known type which will provide letters, numbers or other identifying symbols when power is applied thereto. It will be understood that in referring to a light for a given number, lighting systems employing a bank of lights are contemplated. Similarly, means other than lights, which can be included in the circuitry of this invention and which provide means for identification in a similar fashion, can also be employed.

In the example illustrated, the lights 358 are connected to common conductors 360 which lead to stepper level 220. This stepper level is controlled by coil 162, and conductors 362 connect positions on the level 220 with corresponding positions on stepper lever 218, the latter also being controlled by coil 162. The wiper of stepper 218 is connected by means of normally closed switch 216 to power source 364 and, accordingly, power is delivered through the steppers 218 and 220 to conductor 360.

The individual lights 358 are connected by means of conductors 366 to contacts 368 in selector switches 370. Conductors 372 are secured at the same contact positions 368, and these lead to remote switch units 14. As illustrated, ten conductors 372 are associated with each selector switch and these selector switches represents units, tens and hundreds selections whereby available selection alternatives range from 0 to 1,000. As an example, positioning of the hundreds selector at the number 2 position, the tens selector at the number eight position and the units selector at the number three position will represent identification number 283.

As noted, the conductors 372 are connected to remote switch units 14. The connections are made at three stepper levels provided in each remote switch for this purpose. One level is provided in each switch for the hundreds conductors 372, a separate level for the tens conductors 372 and a third level for the units conductors 372.

The stepper level 374 (FIG. 4) is provided to illustrate one of the three levels associated with a given remote unit. The leads 376 from the contact positions of this stepper are connected to the conductors 372. Ground is applied through the wiper of the stepper and, therefore, in view of the previously described connections, the position of the wiper will determine which of the lights 358 will be operated. With three levels for each remote unit and with the hundreds, tens and units conductors 372 connected at respective levels, three lights 358 will operate depending on the position of the wipers.

The coil 148 which operates the steppers 170 also operates stepper levels of the type shown at 374. Therefore, as the coil advances the steppers 170 for reading of different cables 12, the stepper 374 will also be advanced permitting changing of the identification number as the coil 148 provides for reading of a separate cable. It will be apparent that the conductors 376 and 372 can thus be tied together to provide for positive identification of the temperature reading. It will be noted that the particular number upon the console is mechanically dependent on the position of the remote switch stepper units. Accordingly, a highly reliable means for correlating the cable number and the number appearing on the console is provided. With this arrangement, the operator can be confident that the number appearing before him represents a particular cable, the location of which can be found by referring to a chart or other layout information.

It is also desirable to provide means for visually identifying individual thermocouples in a particular cable. Thus, if cable 283 is being read, visual identification of the several thermocouples therein will provide for precise determination of the temperature conditions at specific locations in a grain bin. The visual identification may, for example, indicate in sequence thermocouples Nos. 283–01, 283–02 and so on up to 283–20.

To provide for identification of the individual thermocouples, conductors 378 are secured to stepper level 380 which is operated by thermocouple coil 146. Lights 384 supplied with power from source 364 are connected to the conductors 378 and these lights operate as the wiper for this stepper passes over the respective contact positions of the stepper.

Since numbers up to twenty, or even higher, may be needed for identification of thermocouples within a given cable, the second half of the stepper 210 can provide for tens digits, while the stepper 380 provides for digits 0 through 9. Thus, the first nine points provide for operation of lights corresponding to the first nine thermocouples in a particular cable. At the tenth point, the wiper of the stepper 380 is moved to a contact connected to the 0 lamp and the wiper of the stepper 210 will move to contact position 386. Conductor 388 secured at this contact position is connected to a light 390 which is adapted to provide lighting of a tens digit. Subsequent steps keep the tens digit lit since the contacts on the stepper 210 are provided with a jumper. Stepping of the stepper 380 will repeat lighting of the numbers 1 through 9 since tie lines 392 provide for operation of the same lights as on the first half of the stepper. The combined tens and units light indications will thus provide numbers 11, 12, etc. The lead 394 connected to light 396 can provide for the twentieth numerical indication when the wiper of stepper 210 reaches contact position 395.

As previously noted, the system of this invention can provide for the reading of specific ones of the thermocouples without the need for waiting for the system to read each preceding thermocouple. Specifically, the circuitry of this invention permits selection of a particular thermocouple cable or group by its identification number. After this selection, the system is designed to rapidly "search" for this thermocouple cable. The system will then stop when reaching the desired position and reading of the selected thermocouple cable is then carried out. It will also be appreciated, after considering the following description, that after the desired position in the system is reached, further readings can proceed either manually or automatically to any extent desired.

In order to proceed with random selection, the selector switches 370 on the console 20 are first set at positions corresponding to the number of the cable 12 which contains the desired thermocouple. For example, if it is desired to record the temperature at the location of a thermocouple in a cable numbered 283, the hundreds switch 370 is placed at the two position, the tens switch at the eight position, and units switch at the three position.

After this is done, the select cable pushbutton switch 202 is closed completing a circuit which includes terminals 204 and 206. As shown in FIG. 4, completing the circuit between 204 and 206 provides for energization of coil 208, ground being supplied through the wiper of stepper 210. The stepper 210 must be on one of the first nine contacts to supply this ground. If not, then the thermocouple coil 146 can be energized by operating switch 357 thereby resetting the thermocouple switches.

When ground is applied to the coil 208, it operates switches 212, 214 and 216. Movement of the contacts of the switch 216 removes battery from the identifying lights circuit and provides battery through resistors 222 and to the terminals 224, 226 and 228. Furthermore, the coil 229 is energized since battery is applied thereto through diodes 231.

Closing of the switch 212 provides ground to the stepper level 180. This ground is applied through conductor 233 to coil 246 if the stepper 180 is in the position shown. If the stepper 180 is at some intermediate position, ground is applied through conductor 236 and through contacts 182 to the coil 246. Energization of the coil 246 will cause stepping of the thermocouple steppers 156, 180 and 210 through operation of the interrupter contacts 184 and coil 146. This resetting operation of the thermocouple steppers normally ends when the wipers reach the respective points 158, 162 and 237, since cam switch 182 is mechanically opened when the steppers reach these points. However, with the switch 212 closed, ground is applied through conductor 233 to permit one additional step. During this operation of the coil 246, the coil 208 remains energized since ground is supplied therefor through conductor 240, diode 241 and switch 214.

Ground is also provided through conductors 236 and 256 when the switch 212 is closed. This ground shunts the coil 140 and prevents operation of the timing circuit.

After resetting of the stepper 180 to the first contact position, ground for the coil 208 is supplied through switch 212, conductor 402, switch 404 and diodes 406 and 241. The conductor 408 also provides ground through switch 404 to the stepped 160. Accordingly, a remote coil of the type shown at 148 will be energized, cocking steppers associated with the coil. In the case of the coil 148, the steppers 170 will be cocked at this time.

Energization of a remote coil 148 pulls in switch 155 and applies ground to coil 229 through the conductor 409. This ground shunts coil 229 and, accordingly, switch 404 will be opened. Opening of the switch 404 de-energizes coil 148 resulting in stepping of the stepper levels associated with this coil. The switch 155 opens at this time, removing the shunt across the coil 229 thereby again closing switch 404. The coil 208 does not drop out when the switch 404 opens due to the provision of capacitor-resistor 210.

Closing of the switch 404 again energizes coil 148 repeating the shunting action across the coil 229 and, therefore, the remote steppers 170 are moved in a rapid, sequential fashion. When these steppers reach their end positions, the cam switch 236 is closed applying battery to coil 162 in the manner previously explained. When the coil 229 again operates, ground is applied to the coil 162, cocking the section steppers associated therewith. The remote switches 170 are stepped to the home position in the manner previously described, and the coil 162 is de-energized when the remote switches reach the home position and, therefore, the section steppers associated with the coil 162 are stepped. Therefore, rapid, sequential movement of the steppers associated with the next remote switch unit is accomplished in the same manner. A remote stepper level 413 applies ground for shunting coil 229 during homing of the remote switches. Stepper level 232 is provided with a jumper wire to enable skipping over unused cable portions during sequential scanning.

As previously noted, energization of the coil 208 reverses switch 216 and applies battery to terminals 224, 226 and 228. As shown in FIG. 2, these terminals are connected to leads 412 which are, in turn, connected to rotary contacts 414 employed in the selector switches 370. When the selectro switches 370 are set, preparatory to random selection, the contacts 414 are positioned so that one of the plates 416 is beneath a contact arm in each switch. The exact position of the arms will, of course, depend on the number of the cable selected. The plates 416 bridge the contacts 368 and, accordingly, ground is adapted to be applied to these contacts from a remote switch unit through one of the conductors 372.

At the point where the selector switches 370 are positioned, the leads 372 at this position, and the leads 376 connected thereto, provide for communication between rotary contacts 414 and specific positions on the three levels of one of the remote units. As the system rapidly steps through the various remote units, eventually wipers on the three levels of this remote switch will contact the positions at which these leads 376 are connected. Accordingly, ground will be applied to the rotary contacts 414 and to the terminals 224, 226 and 228.

The application of ground to these terminals provides a shunt across the coil 229 preventing further energization of this coil. Since the coil 229 will not energize, the coil 208 will drop out preventing any further searching by the system. Since the switch 216 is reversed when the coil 208 drops out, battery is applied to the cable identifying lights and the number of the selected cable will then appear on the face of the console. Reading of the thermocouple in the desired cable can proceed by operation of the thermocouple switch 357 or automatic scanning of all subsequent thermocouples can proceed from this point by closing switch 128.

Compensating resistors 420 can be included in the lines between the stepper levels 218 and 220 which provide for operation of the indicating lights. These resistors are included if the length of these lines is insufficient to step down the voltage supplied to the lamps. Thus, where a power source of 28 volts is used for 14 volt lamps, it is necessary to provide for a loss of 14 volts in the lines so prevent overpowering of the lamps.

It will be appreciated that the scanning system described provides many outstanding features. The unique design permits the scanning of a great number of points with a minimum number of switches and a minimum number of switch operations. The random, automatic selection permits reading of any particular thermocouple cable by simply setting dials for the cable number and intiating the automatic selection circuit.

The system of this invention is also unique in that a highly satisfactory means for identifying the readings being taken in provided. Since the operation of identifying lights on the console face is mechanically dependent upon movement of thermocouple read-out switches to specific locations, the chance of an erroneous identification is virtually eliminated. It will also be appreciated, when considering the identifying arrangement, that the identifying system need not be limited to three numbers per cable. The described circuitry can be saily provided the additional mechanisms to permit any number of identifying digits. Also in this regard, the grounds for the identifying lights can be partially supplied through connection with stepper levels which are operated by section coil 162. Thus, in certain situations, the identification numbers of a group of cables connected to a particular remote switch unit 14 may have a common digit. Cables connected to a given remote unit may have the identifying numbers 120 through 140. Accordingly, a level associated with the coil 162 may have a lead secured to the number one position on the hundreds selector switch, and this number will then remain lighted during reading of all the remote positions connected at this location on the section stepper.

Thermocouples of any suitable type can be utilized in the system of this invention. In a representative embodiment, the thermocouple cables 12 comprise a common constantan wire having a plurality of copper wires connected thereto. The copper wires are provided in lines for connection with the contact positions on the thermocouple stepper 168, while the constantan is connected directly to the potentiometer.

It will be understood that various modifications can be made in the above described scanning system which provide the characteristics of this invention without departing from the spirit thereof, particularly as defined in the following claims.

I claim:

1. A scanning system for the reading of a plurality of of temperatures in a large number of locations, said system comprising thermocouples situated in each of said locations, a plurality of first switch means, a plurality of contact positions on said first switch means with each contact position being connected to a different thermocouple, means connecting said contact positions with means for detecting said temperatures, and an actuating means associated with each of said first switch means for moving said first switch means to different ones of their contact positions, second switch means having a plurality of contact positions, means connecting the contact positions of said second switch means to said actuating means, means for switching said second switch means to its different contact positions, and means connected to said second switch means for operating said actuating means whereby one of said actuating means is adapted to be operated at any one time depending on the position of said second switch means, and whereby the detecting of temperatures by said temperature detecting means depends upon the positioning of a first switch means by its respective actuating means, and including separate means connected to said second switch means for operating said actuating means, means for preventing operation of said temperature detecting means while said separate means is operating, whereby said second switch means can be moved by said actuating means without delay for detecting of temperatures.

2. A scanning system for the reading of a plurality of temperatures in a large number of locations, said system comprising thermocouples situated in each of said locations, a plurality of first switch means, a plurality of contact positions on said first switch means with each contact position being connected to a different thermocouple, means connecting said contact positions with means for detecting said temperatures, and an actuating means associated with each of said first switch means for moving said first switch means to different ones of their contact positions, second switch means having a plurality of contact positions, means connecting the contact positions of said second switch means to said actuating means, means for switching said second switch means to its different contact positions, and means connected to said second switch means for operating said actuating means whereby one of said actuating means is adapted to be operated at any one time depending on the position of said second switch means, and whereby the detecting of temperatures by said temperature detecting means depends upon the positioning of a first switch means by its respective actuating means, and including a light switching means operatively associated with each of said first and second switch means, contact positions on said light switching means, means for lighting different identifying symbols when said light switching means are moved to different positions, said means for moving the switches operatively associated with the light switching means also serving to move said light switching means.

3. A system in accordance with claim 2 wherein said thermocouples are assigned identifying symbols, means for visually presenting said symbols for observation by the operator of the system, said presenting means being operatively connected to said switch means whereby said symbols are changed automatically as said switch means read different thermocouples.

4. A scanning system for the reading of a plurality of temperatures in a large number of locations comprising thermocouples situated in each of said locations, a plurality of remote switch means each connected to different portions of said thermocouples, a plurality of contact positions on said remote switch means, a potentiometer, thermocouple switch means associated with said potentiometer and connected to said contact positions whereby temperatures are detected when individual thermocouples are placed in circuit with the potentiometer, a set of first electro-responsive means connected individually to said remote switch means for moving said remote switch means to different ones of said contact positions, section switch means having a plurality of contact positions, conductors connecting the contact positions of said section switch means to respective ones of said first electro-responsive means, second electro-responsive means for moving said second switch means to its different contact positions, and third electro-responsive means connected to said section switch means for operating said first electro-responsive means whereby one of said first electro-responsive means is adapted to be operated depending on the position of said section switch means and whereby detecting of temperatures by said potentiometer depends upon the positioning of said remote switch means by its associated first electro-responsive means, and whereby operation of said first electro-responsive means sequentially places individual groups of thermocouples into position for temperature detection, said third electro-responsive means being adapted to initiate detection of each member of each group prior to the next operation of said first electro-responsive means.

5. A system in accordance with claim 4 including light switching means operatively associated with at least one of said remote switches and section switches, contact positions on said light switching means, means for lighting different identifying symbols when said light switching means are moved to different positions, the electro-responsive means for moving the remote switch means and section switch means also serving to move said light switching means.

6. A system in accordance with claim 4 including an automatic pushbutton switch, a pulsing unit adapted to deliver pulses in response to closing of said switch, said pulsing unit being connected to said potentiometer whereby said potentiometer can be operated to detect a different thermocouple each time a pulse is delivered thereto, said pulsing unit also being connected to said first electro-responsive means through said section switch means whereby said first electro-responsive means is operated each time a pulse is delivered thereto.

7. A scanning system for the reading of temperatures wherein a plurality of thermocouples are located in several storage bins, said thermocouples being located at different locations within said bins, a plurality of remote switch units located in proximity with different groups of said bins, thermocouples in each of said groups being connected to said units, said units each including a stepper switch having a plurality of stepper levels, said thermocouples each being connected to different contact positions on some of the stepper levels, a potentiometer, thermocouple switch means associated with said potentiometer and connected to the contact positions on the stepper levels occupied by said thermocouples whereby temperatures can be detected when individual thermocouples are placed in circuit with the potentiometer, a plurality of first electro-responsive means for individually moving the stepper levels in each of said remote switch units, section stepper means having a plurality of contact positions, second electro-responsive means for operating said section stepper means, conductors connecting contact positions on said section stepper means to individual ones of the first electro-responsive means whereby one of said first electro-responsive means is adapted to be operated depending on the position of said section stepper means and whereby detecting of temperatures by said potentiometer depends upon the positioning of said remote switch means by said first electro-responsive means, and wherein third electro-responsive means are provided for operating said first electro-responsive means through the contact positions on said section stepper, operation of said first electro-responsive means sequentially places individual groups of thermocouples into position for temperature detection, said third electro-responsive means being adapted to initiate operation of said thermocouple switch for detection of each member of each group of thermocouples prior to the next operation of said first electro-responsive means.

8. A system in accordance with claim 7 wherein some of the levels in said stepper means comprise light switching means, lighting units electrically connected to said switching means for lighting different identifying symbols when said light switching means are moved to different positions, said first and second electro-responsive means also serving to move said light switching means when said steppers are moved thereby.

9. A system in accordance with claim 7 including a pushbutton switch adapted to be manually operated, closing of said pushbutton switch being effective to energize said third electro-responsive means to move said thermocouple switch for reading of successive thermocouples.

10. A system in accordance with claim 7 including an automatic pushbutton switch, a pulsing unit adapted to deliver pulses in response to closing of said switch, said pulses being delivered to said third electro-responsive means, said pulsing unit being connected to said third electro-responsive means and said third electro-responsive means being adapted to operate said thermocouple switch whereby the potentiometer is adapted to detect temperatures from different thermocouples each time said pulsing unit operates said thermocouple switch.

11. A scanning system for the reading of a plurality of temperatures in a large number of locations, said system comprising thermocouples situated in each of said locations, a plurality of first switch means, a plurality of contact positions on said first switch means with each contact position being connected to a different thermocouple, means connecting said contact positions with means for detecting said temperatures, and an actuating means associated with each of said first switch means for moving said first switch means to different ones of their contact positions, second switch means having a plurality of contact positions, means connecting the contact positions of said second switch means to said actuating means, means for switching said second switch means to its different contact positions, and means connected to said second switch means for operating said actuating means whereby one of said actuating means is adapted to be operated at any one time depending on the position of said second switch means, and whereby the detecting of temperatures by said temperature detecting means depends upon the positioning of a first switch means for its respective actuating means, and wherein the electrical circuit for said system includes a pushbutton switch adapted to be manually operated, said pushbutton switch being adapted to effect operation of said actuating means, and an automatic pushbutton switch, a pulsing unit adapted to deliver intermittent current pulses in response to closing of said switch, said pulsing unit being connected to said temperature detecting means whereby said detecting means can be operated to detect a different thermocouple each time a pulse is delivered thereto, said pulsing unit also being connected to said actuating means through said second switch means whereby said actuating means is operated each time a pulse is delivered thereto.

12. A scanning system for the reading of a plurality of temperatures in a large number of locations, said system comprising thermocouples situated in each of said locations, a plurality of first switch means, a plurality of contact positions on said first switch means with each contact position being connected to a different thermocouple, means connecting said contact positions with means for detecting said temperatures, and an actuating means associated with each of said first switch means for moving said first switch means to different ones of their contact positions, second switch means having a plurality of contact positions, means connecting the contact positions of said second switch means to said actuating means, means for switching said second switch means to its different contact positions, and means connected to said second switch means for operating said actuating means whereby one of said actuating means is adapted to be operated at any one time depending on the position of said second switch means, and whereby the detecting of temperatures by said temperature detecting means depends upon the positioning of a first switch means by its respective actuating means, and including a console having selector switches thereon, said thermocouples having identifying symbols assigned thereto, said selector switches being adapted to be located at positions corresponding to each of said symbols, means for visually presenting said symbols for observation by the operator of the system, said presenting means being operatively connected to said switch means whereby said symbols are changed automatically as said switch means read different thermocouples, separate means connected to said second switch means for operating said actuating means, means for preventing operation of said temperature detecting means and the associated presenting means while said separate means is operating, whereby said first switch means can be moved by said actuating means without delay for detecting of temperatures, and means connected between said first switch means and said selector switches adapted to discontinue operation of said separate means when said first switch means reaches contact positions of thermocouples having identifying symbols corresponding to the location set on said selector switches, whereby said system is adapted to read the thermocouples at this contact position and whereby said presenting means is adapted to simultaneously visually present the symbols for the thermocouples at this position.

13. A scanning system for the reading of a plurality of temperatures in a large number of locations comprising thermocouples situated in each of said locations, a plurality of remote switch means each connected to different portions of said thermocouples, a plurality of contact positions on said remote switch means, a potentiometer, thermocouple switch means associated with said potentiometer and connected to said contact positions whereby temperatures are detected when individual thermocouples are placed in circuit with the potentiometer, a first electro-responsive means for individually moving said remote switch means to different ones of said contact positions, section switch means having a plurality of contact positions, conductors connecting the contact positions of said section switch means to said first electro-responsive means, second electro-responsive means for moving said second switch means to its different contact positions, and means connected to said section switch means for operating said first electro-responsive means whereby one of said first electro-responsive means is adapted to be operated depending on the position of said section means and whereby detecting of temperatures by said potentiometer depends upon the positioning of said remote switch means by its associated first electro-responsive means including an automatic pushbutton switch, a pulsing unit adapted to deliver pulses in response to closing of said switch, said pulsing unit being connected to said potentiometer whereby said potentiometer can be operated to detect a different thermocouple each time a pulse is delivered thereto, said pulsing unit also being connected to said first electro-responsive means through said section switch means whereby said first electro-responsive means is operated each time a pulse is delivered thereto, and including a separate circuit connection between said pulsing unit and said section switch means, and means in said circuit for preventing delivery of pulses to said thermocouple switch when said circuit is completed, whereby said pulses can be passed through said section switch means to said first electro-responsive means for moving said remote switch means without delay for detecting of temperatures, said circuit connection also providing for energization of said second electro-responsive means to provide for switching of said section switch means.

14. A scanning system for the reading of a plurality of temperatures in a large number of locations comprising thermocouples situated in each of said locations, a plurality of remote switch means each connected to different portions of said thermocouples, a plurality of contact positions on said remote switch means, a potentiometer, thermocouple switch means associated with said potentiometer and connected to said contact positions whereby temperatures are detected when individual thermocouples are placed in circuit with the potentiometer, a first electro-responsive means for individually moving said remote switch means to different ones of said contact positions, section switch means having a plurality of contact positions, conductors connecting the contact positions of said section switch means to said first electro-responsive means, second electro-responsive means for moving said second switch means to its different contact positions, and means connected to said section switch means for operating said first electro-responsive means whereby one of said first electro-responsive means is adapted to be operated depending on the position of said section switch means and whereby detecting of temperatures by said potentiometer depends upon the positioning of said remote switch means by its associated first electro-responsive means, and including a console having selector switches thereon, said thermocouples having identifying symbols assigned thereto, said selector switches being adapted to be located at positions corresponding to each of said symbols, lighting units for visually presenting said symbols for observation by the operator of the system, said lighting units being electrically connected to said remote switch means whereby said symbols are changed automatically as said remote switch means read different thermocouples, a separate electrical circuit connected to said section switch means for delivering current pulses thereto, and means in said circuit for preventing delivery of pulses to said thermocouple switch means when said circuit is completed, whereby said pulses can be passed through said section switch means to said first electro-responsive means for moving said remote switch means without delay for detecting of temperatures, said circuit connection also providing for energization of said second electro-responsive means to provide for switching of said section switch means, means for preventing operation of said lighting units when said separate electrical circuit is completed, and means connected between said remote switch means and said selector switches adapted to open said separate electrical circuit when said remote switch means reaches the contact positions of thermocouples having identifying symbols corresponding to the location set on said selector switches whereby said system is adapted to read the thermocouples at this contact position, and whereby said lighting units are adapted to simultaneously present the symbols for the thermocouples at this position.

15. A scanning system for the reading of temperatures wherein a plurality of thermocouples are located in several storage bins, said thermocouples being located at different locations within said bins, a plurality of remote switch units located in proximity with different groups of said bins, thermocouples in each of said groups being connected to said units, said units each including a stepper switch having a plurality of stepper levels, said thermocouples each being connected to different contact positions on some of the stepper levels, a potentiometer, thermocouple switch means associated with said potentiometer and connected to the contact position on the stepper levels occupied by said thermocouples whereby temperatures can be detected when individual thermocouples are placed in circuit with the potentiometer, a plurality of first electro-responsive means for individually moving the stepper levels in each of said remote switch units, section stepper means having a plurality of contact positions, second electro-responsive means for operating said section stepper means, conductors connecting contact positions on said section stepper means to individual ones of the first electro-responsive means whereby one of said first electro-responsive means is adapted to be operated depending on the position of said section stepper means and whereby detecting of temperatures by said potentiometer depends upon the positioning of said remote switch means by said first electro-responsive means, and including a console having selector switches thereon, said thermocouples having identifying symbols assigned thereto, said selector switches being adapted to be located at positions corresponding to each of said symbols, some of the levels in said remote switch units comprising light switching means, light units for visually presenting said symbols for observation by the operator of the system, said lighting units being electrically connected to said light switch means whereby different symbols are adapted to be presented as said first electro-responsive means advances the stepper levels of said remote switch units, separate electrical circuit means connected to said section stepper means for operating said first electro-responsive means, means for preventing operation of said thermocouple switch while said separate circuit is completed, whereby the stepper levels in said remote switch units can be advanced by said first electro-responsive means without delay for detecting of temperatures, means for preventing operation of said lighting units when said separate circuit is completed, and means connected between said lighting switch levels in said remote switch unit and said selector switches adapted to open said separate circuit when said first switch means reaches contact positions of thermocouples having identifying symbols corresponding to the location set on said selector switches, whereby said system is adapted to read the thermocouples at this contact position and whereby said lighting units are adapted to simultaneously visually present the symbols for the thermocouples at this position.

References Cited by the Examiner

UNITED STATES PATENTS

| | | | |
|---|---|---|---|
| 2,877,444 | 3/59 | Hawley | 340—183 |
| 2,942,471 | 6/60 | Hefti et al. | 73—341 |
| 2,981,107 | 4/61 | Anderson | 73—341 |
| 3,077,775 | 2/63 | Hoffman | 73—341 |
| 3,103,817 | 9/63 | Ludwig | 73—341 |

FOREIGN PATENTS 593,708  10/47  Great Britain.

OTHER REFERENCES

A Six-Point, High-Speed, Thermocouple Temperature-Recording Equipment, by J. D. Watson and H. E. Dixon (article in Journal of Scientific Instruments), vol. 26, January 1949, pages 17–18 relied on.

ISAAC LISANN, *Primary Examiner.*